US011427887B2

(12) United States Patent
Ibrahim et al.

(10) Patent No.: US 11,427,887 B2
(45) Date of Patent: Aug. 30, 2022

(54) EXTRACTION OF SELECTED PLATINUM-GROUP METALS FROM SUPPORTED CATALYST

(71) Applicant: The Board of Trustees of the University of Illinois, Urbana, IL (US)

(72) Inventors: Malek Y. S. Ibrahim, Urbana, IL (US); Scott E. Denmark, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 460 days.

(21) Appl. No.: 16/199,568

(22) Filed: Nov. 26, 2018

(65) Prior Publication Data

US 2019/0161824 A1    May 30, 2019

Related U.S. Application Data

(60) Provisional application No. 62/590,833, filed on Nov. 27, 2017.

(51) Int. Cl.
  *C22B 11/00* (2006.01)
  *C22B 7/00* (2006.01)
  (Continued)

(52) U.S. Cl.
  CPC .............. *C22B 11/04* (2013.01); *B01D 53/94* (2013.01); *C22B 3/1625* (2013.01); *C22B 3/22* (2013.01);
  (Continued)

(58) Field of Classification Search
  CPC ......... C22B 11/04; C22B 3/22; C22B 11/048; C22B 3/0024; C22B 5/12; C22B 3/1625;
  (Continued)

(56) References Cited

U.S. PATENT DOCUMENTS 3,723,459 A    3/1973  Paragamian
3,960,549 A *  6/1976  MacGregor .............. C22B 3/001
                                                    75/421

(Continued)

FOREIGN PATENT DOCUMENTS

EP       0 962 457 A1   12/1999
WO    WO 2003/010346 A2   2/2003

(Continued)

OTHER PUBLICATIONS

Harjanto et al., "Leaching of Pt, Pd and Rh from Automotive Catalyst Residue in Various Chloride Based Solutions", 2006, Materials Transactions, Vo. 47, pp. 129-135) (Year: 2006).*

(Continued)

*Primary Examiner* — Keith Walker
*Assistant Examiner* — Adil A. Siddiqui
(74) *Attorney, Agent, or Firm* — Crowell & Moring LLP

(57) ABSTRACT

Disclosed herein is a method for extracting precious metals from supported catalysts. The precious metal in one embodiment is rhodium. The supported catalyst may be from equipment, such as a used catalytic converter. The method is carried out at low temperature, and does not require harsh conditions, such as the use of a strong acid. The method involves contacting the catalytic material with a polar molecule and a reactive gas.

19 Claims, 5 Drawing Sheets

(51) Int. Cl.
| | |
|---|---|
| *B01D 53/94* | (2006.01) |
| *C22B 3/22* | (2006.01) |
| *C22B 5/12* | (2006.01) |
| *C22B 3/16* | (2006.01) |
| *C22B 3/32* | (2006.01) |
| *C22B 3/28* | (2006.01) |

(52) U.S. Cl.
CPC ............... *C22B 3/282* (2021.05); *C22B 3/32* (2021.05); *C22B 5/12* (2013.01); *C22B 7/009* (2013.01); *C22B 11/048* (2013.01); *B01D 2255/1025* (2013.01)

(58) Field of Classification Search
CPC ....... C22B 3/0012; C22B 7/009; B01D 53/94; B01D 2255/1025; Y02P 10/20
USPC ........... 75/717; 423/22, 658.5; 502/326, 339
See application file for complete search history.

(56) References Cited

U.S. PATENT DOCUMENTS

| | | | |
|---|---|---|---|
| 3,985,854 A | 10/1976 | Bradford et al. | |
| 4,292,196 A * | 9/1981 | Homeier | B01J 31/20 502/161 |
| 4,871,432 A * | 10/1989 | Pardy | B01J 31/20 204/529 |
| 5,102,632 A | 4/1992 | Allen et al. | |
| 5,160,711 A | 11/1992 | Atkinson et al. | |
| 5,294,415 A * | 3/1994 | Lappe | C22B 3/0051 423/22 |
| 5,478,376 A * | 12/1995 | Grant | C22B 3/44 75/722 |
| 6,455,018 B1 * | 9/2002 | Cuif | C22B 11/04 423/21.1 |
| 7,740,685 B2 | 6/2010 | Holgersen | |
| 7,951,223 B2 * | 5/2011 | Nagai | C22B 11/06 75/426 |
| 8,852,547 B2 | 10/2014 | Ma et al. | |
| 9,266,916 B2 | 2/2016 | Saito et al. | |
| 9,580,770 B2 | 2/2017 | Bhaduri et al. | |
| 2003/0236440 A1 * | 12/2003 | Chen | C01B 3/386 568/959 |
| 2004/0026329 A1 * | 2/2004 | Ekman | C22B 11/048 210/723 |
| 2004/0241066 A1 * | 12/2004 | Jasra | C22B 7/007 423/22 |
| 2008/0110296 A1 * | 5/2008 | Thomas | B01J 41/04 75/723 |
| 2008/0282842 A1 | 11/2008 | Holgersen | |
| 2016/0032472 A1 * | 2/2016 | Skou | C22B 3/44 205/557 |
| 2017/0145542 A1 * | 5/2017 | Lubomirsky | C01G 55/005 |
| 2018/0371578 A1 * | 12/2018 | Liddell | C22B 3/44 |

FOREIGN PATENT DOCUMENTS

| | | |
|---|---|---|
| WO | WO 2005/098058 A1 | 10/2005 |
| WO | WO 2009/094732 A1 | 8/2009 |
| WO | WO 2010/084364 A1 | 7/2010 |
| WO | WO 2014/091456 A1 | 6/2014 |
| WO | WO 2016/064444 A1 | 4/2016 |

OTHER PUBLICATIONS

Abe, Fujio, et al., "Ruthenium-catalyzed Reductive Alkylation of Active Methylene Compounds with Aldehydes under Synthesis Gas", Chem. Lett., 1990, 19, pp. 765-768.
Adair, Gareth R.A., et al., "Ruthenium catalyzed reduction of alkenes using sodium borohydride", Tetrahedron Lett., 2006, 47, pp. 8943-8944 <doi.10.1016/j.tetlet.2006.10.026>.
Afanasyev, Oleg I., et al., "Cyclobutadiene Metal Complexes: A New Class of Highly Selective Catalysts. An Application to Direct Reductive Amination", ACS Catal., 2016, 6, pp. 2043-2046 <doi. 10.1021/acscatal.5b02916>.
Alessio, E., et al., "Activation of $Rh_6(CO)_{16}$ With 1,10-Phenanthroline and Substituted Derivatives in the Catalytic Reduction of Nitrobenzene to Aniline With Carbon Monoxide and Water", J. of Mol. Catal., 1984, 22, pp. 327-339.
Ambrosi, Andrea, et al., "Harnessing the Power of the Water-Gas Shift Reaction for Organic Synthesis", Angew. Chem., Int. Ed. 2016, 55, pp. 12164-12189 <doi:10.1002/anie.201601803>.
Angelini, Guido, et al., "Effect of Ring Size on the Tautomerization and Ionization Reaction of Cyclic 2-Nitroalkanones: An Experimental and Theoretical Study", J. Org. Chem., 2012, 77, 2, pp. 899-907. Retrieved from <https://pubs.acs.org/doi/10.1021/jo202065h>.
Baidossi, Mubeen, et al., "Tandem catalytic condensation and hydrogenation processes in ionic liquids", Tetrahedron Lett., 2005, 46, pp. 1885-1887 <doi:10.1016/j.tetlet.2005.01.092>.
Basu, Basudeb, et al., "Co-immobilized formate anion and palladium on a polymer surface: a novel heterogeneous combination for transfer hydrogenation", Tetrahedron Lett., 2005, 46, pp. 8591-8593 <doi:10.1016/j.tetlet.2005.09.187>.
Bautista, Felipa M., et al., "The Mechanism of Liquid-phase Catalytic Hydrogenation of the Olefinic Double Bond on Supported Nickel Catalysts", J. Chem. Soc. Perkin Trans. II, 1989, pp. 493-498.
Bell, R.P., et al., "The Enol Content and Acidity of Cyclopentanone, Cyclohexanone, and Acetone in Aqueous Solution", J. Chem. Soc. (B), 1966, pp. 241-243.
Bordwell, Frederick G., "Equilibrium Acidities in Dimethyl Sulfoxide Solution", Acc. Chem. Res. 1988, 21, 12, pp. 456-463. Retrieved from <https://pubs.acs.org/doi/10.1021/ar00156a004>.
Bordwell, Frederick G., et al., Bordwell pKa Table (Acidity in DMSO), J. Am. Chem. Soc., 1975, 97, 7006. Retrieved from <https://www.chem.wisc.edu/areas/reich/pkatable/>.
Chan, Louis K.M., et al., "Rhodium-Catalyzed Ketone Methylation Using Methanol Under Mild Conditions: Formation of α-Branched Products", Angew. Chem. Int. Ed., 2014, 53, pp. 761-765 <doi:10.1002/anie.201307950>.
Che, Jun, et al., "Polymer-Supported Hantzsch 1,4-Dihydropyridine Ester: An Efficient Biomimetic Hydrogen Source for the Reduction of Ketimines and Electron-Withdrawing Group Conjugated Olefins", Adv. Synth. Catal., 2010, 352, 1752-1758 <doi.10.1002/adsc. 201000093>.
Chikashita, Hidenori, et al., "In Situ Generation and Synthetic Application of 2-Phenylbenzimidazoline to the Selective Reduction of Carbon-Carbon Double Bonds of Electron-Deficient Olefins", Bull. Chem. Soc. Jpn., 1987, vol. 60, No. 2, pp. 737-746.
Chikashita, Hidenori, et al., "Lewis Acid-promoted Conjugate Reduction of α,β-Unsaturated Carbonyl Compounds by 2-Phenylbenzothiazoline (2-Phenyl-2,3-dihydrobenzothiazole)", J. Chem. Soc. Perkin Trans., I, 1987, pp. 699-706.
Chini, P., et al., "High Nuclearity Metal Carbonyl Clusters", Adv. Organomet. Chem., 1976, 14, pp. 285-344.
Chusov, Denis, et al., "Reductive Amination without an External Hydrogen Source", Angew. Chem. Int. Ed., 2014, 53, pp. 5199-5201 <doi:10.1002/anie.201400059>.
Cini, Elena, et al., "Ruthenium-catalysed C-alkylation of 1,3-dicarbonyl compounds with primary alcohols and synthesis of 3-keto-quinolines", RSC Adv., 2016, 6, pp. 31386-31390 <doi:10.1039/c6ra03585j>.
Denmark, Scott E., et al., "Catalytic, Nucleophilic Allylation of Aldehydes With Allyl Acetate", Org. Lett., 2009, 11, 3, pp. 781-784. Retrieved from <https://pubs.acs.org/doi/10.1021/ol8028725>.
Denmark, Scott E., et al., "Catalytic, Nucleophilic Allylation of Aldehydes with 2-Substituted Allylic Acetates: Carbon—Carbon Bond Formation Driven by the Water-Gas Shift Reaction", J. Org. Chem., 2014, 79, 13, pp. 5970-5986. Retrieved from <https://pubs.acs.org/doi/10.1021/jo501004j>.
Denmark, Scott, E., et al., "Room Temperature, Reductive Alkylation of Activated Methylene Compounds: Carbon-Carbon Bond Formation Driven by the Rhodium-Catalyzed Water-Gas Shift Reaction",

(56) References Cited

OTHER PUBLICATIONS

ACS Catal., 2017, 7, 1, pp. 613-630. Retrieved from <https://pubs.acs.org/doi/10.1021/acscatal.6b03183>.

Dobereiner, Graham E., et al., "Dehydrogenation as a Substrate-Activating Strategy in Homogeneous Transition-Metal Catalysis", Chem. Rev. 2010, 110, 2, pp. 681-703. Retrieved from <https://pubs.acs.org/doi/10.1021/cr900202j>.

Elamparuthi, Elangovan, et al., "Total Synthesis of Cyrneine A", Angew.Chem. Int. Ed., 2012, 51, pp. 4071-4073 <doi:10.1002/anie.201200515>.

Elangovan, Saravanakumar, et al., "Iron-Catalyzed a-Alkylation of Ketones with Alcohols", Angew. Chem. Int. Ed., 2015, 54, p. 14483-14486 <doi:10.1002/anie.201506698>.

Emerson, William S., "The Preparation of Amines By Reductive Alkylation", Org. React., 1948, 4, pp. 174-255.

Garrido, Gemma, et al., "Acid-Base Equilibria in Nonpolar Media. Absolute $pK_a$ Scale of Bases in Tetrahydrofuran", J. Org. Chem., 2006, 71, 24, pp. 9062-9067. Retrieved from <https://pubs.acs.org/doi/10.1021/jo061432g>.

Goettmann, Frédéric, et al., "New P∧O ligand grafted on Periodically organized mesoporous silicas for one-pot bifunctionnal catalysis: Coupling of base catalyzed Knoevenagel condensation with in situ Rh catalyzed hydrogenation", Chem. Commun., 2004, pp. 1240-1241 <doi:10.1039/b403491k>.

Goldsmith, Bryan R., et al., "CO- and NO-Induced Disintegration and Redispersion of Three-Way Catalysts Rhodium, Palladium, and Platinum: An ab Initio Thermodynamics Study", J. Phys. Chem. C, 2014, 118, 18, pp. 9588-9597. Retrieved from <http://dx.doi.org/10.1021/jp502201f>.

Gong, Jing, et al., "Total synthesis of atropurpuran", Nat. Commun., 2016, 7, 12183. Retrieved from <https://www.nature.com/articles/ncomms12183>.

Gross, David C., et al., "Kinetics of carbon monoxide activation: reactions of methoxide and of hydroxide with ruthenium and iron carbonyls" Inorg. Chem., 1982, 21, pp. 1702-1704. Retrieved from <https://pubs.acs.org/doi/10.1021/ic00134a097>.

Hamid, Malai Haniti S.A., et al., "Borrowing Hydrogen in the Activation of Alcohols", Adv. Synth. Catal., 2007, 349, 10, pp. 1555-1575. Retrieved from <https://onlinelibrary.wiley.com/doi/abs/10.1002/adsc.200600638>.

He, Qi, et al., "Catalyst-free chemoselective reduction of the carbon-carbon double bond in conjugated alkenes with Hantzsch esters in water", RSC Adv., 2014, 4, pp. 8671-8674 <doi:10.1039/c3ra48072k>.

Harjanto, Sri., et al., "Leaching of Pt, Pd and Rh from Automotive Catalyst Residue in Various Chloride Based Solutions", Materials Transactions, 2006, 47, 1, pp. 129-135.

Jackman, Lloyd M., et al., "Structure and Reactivity of Alkali Metal Enolates", Tetrahedron, vol. 33, No. 21-B, pp. 2737-2769.

Jacobs, G., et al., "Low temperature water-gas shift catalysts", Catalysis, 2007, 20, pp. 122-285. Retrieved from <https://pubs.rsc.org/doi/10.1039/B601305H>.

Jensen, Thomas, et al., "Ruthenium-Catalyzed Alkylation of Oxindole with Alcohols", J. Org. Chem., 2009, 74, 10, pp. 3990-3992. Retrieved from <https://pubs.acs.org/doi/10.1021/jo900341w>.

Jones, G., et al., "The Knoevenagel Condensation", Org. React., 1967, 15, pp. 204-599.

Kaljurand, Ivari, et al., "Extension of the Self-Consistent Spectrophotometric Basicity Scale in Acetonitrile to a Full Span of 28 $pK_a$ Units: Unification of Different Basicity Scales", J. Org. Chem., 2005, 70, 3, 1019-1028. Retrieved from <https://pubs.acs.org/doi/10.1021/jo048252w>.

Kaneda, Kiyotomi, et al., "An Active Catalyst for the Water Gas Shift Reaction Using a Rhodium Carbonyl Cluster—Diamine System", J. Mol. Catal., 1980, 9, pp. 227-230.

Kleinpeter, Erich, "Push-pull alkenes: structure and π-electron distribution", J. Serb. Chem. Soc. 2006, 71(1), pp. 1-17. <doi:10.2298/JSC0601001K>.

Kolesnikov, Pavel N., et al., "Atom- and Step-Economical Preparation of Reduced Knoevenagel Adducts Using CO as a Deoxygenative Agent", Org. Lett. 2014, 16, 19, pp. 5068-5071. Retrieved from <https://pubs.acs.org/doi/4Q.1021/ol502424t>.

Kolesnikov, Pavel N., et al., "Ruthenium-Catalyzed Reductive Amination without an External Hydrogen Source", Org. Lett. 2015, 17,2, pp. 173-175. Retrieved from <https://pubs.acs.org/doi/10.1021/ol503595m>.

Kondo, Teruyuki, et al., "Ruthenium Complex Catalyzed Intermolecular Hydroacylation and Transhydroformylation of Olefins with Aldehydes", J. Org. Chem., vol. 55, No. 4, 1990, pp. 1286-1291.

Kondo, Teruyuki, et al., Nucleophilic and Electrophilic Allylation Reactions. Synthesis, Structure, and Ambiphilic Reactivity of ($\eta^3$-Allyl) ruthenium(II) Complexes Organometallics, 1995, 14, 4, pp. 1945-1953. Retrieved from <https://pubs.acs.org/doi/10.1021/orn00004a055>.

Laine, Richard M., et al., "Homogeneous Catalysis of The Water-Gas Shift Reaction", J. Mol. Catal., 1988, 44, pp. 357-387.

Li, Feng, et al., "Direct Coupling of Arylacetonitriles and Primary Alcohols to α-Alkylated Arylacetamides with Complete Atom Economy Catalyzed by a Rhodium Complex-Triphenylphosphine-Potassium Hydroxide System", Adv. Synth. Catal., 2015, 357, pp. 1405-1415 <doi:10.1002/adsc.201401013>.

Li, Ping, et al., "A core-shell-satellite structured Fe3O4@MS-NH2@Pd nanocomposite: a magnetically recyclable multifunctional catalyst for one-pot multistep cascade reaction sequences", Nanoscale, 2014, 6, pp. 442-448 <doi:10.1039/c3nr04427k>.

Li, Ping, et al., "One-Pot Multistep Cascade Reactions over Multifunctional Nanocomposites with Pd Nanoparticles Supported on Amine-Modified Mesoporous Silica", Chem. Asian J., 2013, 8, pp. 2459-2465 <doi:10.1002/asia.201300514>.

Löfberg, Christian, et al., "Efficient Solvent-Free Selective Monoalkylation of Arylacetonitriles with Mono-, Bis-, and Tris-primary Alcohols Catalyzed by a Cp*Ir Complex", J. Org. Chem., 2006, 71, 21, pp. 8023-8027. Retrieved from <https://pubs.acs.org/doi/10.1021/jo061113p>.

Löfberg, Christian, et al., "Sequential one-pot bimetallic Ir(III)/Pd(0) catalysed mono-/bis-alkylation and spirocyclisation processes of 1,3-dimethylbarbituric acid and allenes", Chem. Commun., 2006, pp. 5000-5002 <doi:10.1039/b614098>.

Madivada, Lokeswara Rao, et al., "An Improved Process for Pioglitazone and Its Pharmaceutically Acceptable Salt", Org. Process Res. Dev., 2009, 13, 6, pp. 1190-1194. Retrieved from <https://pubs.acs.org/doi/10.1021/op900131m>.

Menegatti, Ricardo, "Green Chemistry—Aspects for the Knoevenagel Reaction", Green Chemistry—Environmentally Benign Approaches, Mazaahir Kidwai and Neeraj Kumar Mishra, IntechOpen, Mar. 23, 2012, DOI:10.5772/36489. Retrieved from <https://www.intechopen.com/books/green-Chemistry-environmentally-benign-approaches/green-chemistry-aspects-for-knoevenagel-reaction->.

Morita, Masao, et al., "Alkylation of active methylene compounds with alcohols catalyzed by an iridium complex", Chem. Commun., 2007, pp. 2850-2852.<doi:10.1039/b702293j>.

Motokura, Ken, et al., "A Ruthenium-Grafted Hydrotalcite as a Multifunctional Catalyst for Direct α-Alkylation of Nitriles with Primary Alcohols", J. Am. Chem. Soc., 2004, 126, pp. 5662-5663 <doi:10.1021/ja049181I>.

Motokura, Ken, et al., "Environmentally Friendly One-Pot Synthesis of α-Alkylated Nitriles Using Hydrotalcite-Supported Metal Species as Multifunctional Solid Catalysts", Chem. Eur. J., 2006, 12, pp. 8228-8239 <doi:10.1002/chem.200600317>.

Motokura, Ken, et al., "One-pot synthesis of α-alkylated nitriles with carbonyl compounds through consecutive aldol reaction/hydrogenation using a hydrotalcite-supported palladium nanoparticle as a multifunctional heterogeneous catalyst", Tetrahedron Lett., 2005, 46, pp. 5507-5510 <doi:10.1016/j.tetlet.2005.06.053>.

Mowry, David T., "The Knoevenagel Condensation of Aryl Alkyl Ketones with Malononitrile", J. Am. Chem. Soc., 1945, 67, 7, pp. 1050-1051. Retrieved from <https://pubs.acs.org/doi/10.1021/ja01223a002>.

Murahashi, Shunichi, et al., "Palladium catalyzed hydrolysis of tertiary amines with water", J. Am. Chem. Soc., 1979, 101, 24, p. 7429-7430. Retrieved from <https://pubs.acs.org/doi/10.1021/ja00518a062>.

(56) References Cited

OTHER PUBLICATIONS

Newhouse, Timothy, et al., "The economies of synthesis", Chem. Soc. Rev., 2009, 38, pp. 3010-3021 <doi:10.1039/b821200g>.
Nixon, Tracy D., et al., "Transition metal catalysed reactions of alcohols using borrowing hydrogen methodology", Dalton Trans., 2009, pp. 753-762 <doi:10.1039/b813383b>.
Nogueira, C.A., et al., "Oxidative leaching process with cupric ion in hydrochloric acid media for recovery of Pd and Rh from spent catalytic converters", Journal of Hazardous Materials, 2014, 278, 15, pp. 82-90. Retrieved from <http://dx.doi.org/10.1016/j.jhazmat.2014.05.099>.
Park, Jang Won, et al., "Hydrogen-Free Cobalt-Rhodium Heterobimetallic Nanoparticle-Catalyzed Reductive Amination of Aldehydes and Ketones with Amines and Nitroarenes in the Presence of Carbon Monoxide and Water", ACS Catal., 2015, 5, pp. 4846-4850 <doi:10.1021/acscatal.5b01198>.
Pridmore, Simon J., et al., "C—C bond formation from alcohols and malonate half esters using borrowing hydrogen methodology", Tetrahedron Lett., 2008, 49, pp. 7413-7415 <doi:10.1016/j.tetlet.2008.10.059>.
Ramachary, Dhevalapally B., et al., "A novel and green protocol for two-carbon homologation: a direct amino acid/$K_2CO_3$-catalyzed four-component reaction of aldehydes, active methylenes, Hantzsch esters and alkyl halides", Tetrahedron Lett., 2006, 47, pp. 651-656 <doi:10.1016/j.tetlet.2005.11.128>.
Ramachary, Dhevalapally B., et al., "Development of Pharmaceutical Drugs, Drug Intermediates and Ingredients by Using Direct Organo-Click Reactions", Eur. J. Org. Chem., 2008, pp. 975-993 <doi:10.1002/ejoc.200701014>.
Ramachary, Dhevalapally B., et al., "Towards organo-click reactions: development of pharmaceutical ingredients by using direct organocatalytic bio-mimetic reductions", Org. Biomol. Chem., 2006, 4, pp. 4463-4468 <doi:10.1039/b612611a>.
Ranu, Brindaban C., et al., "Reduction of activated conjugated alkenes by the $InCl_3$—$NaBH_4$ reagent system", Tetrahedron, 2003, 59, pp. 7901-7906.
Schäfer, Martin, et al., "Binding Two $C_2$ Units to an Electron-Rich Transition-Metal Center: The Interplay of Alkyne (alkynyl), Bisalkynyl(hydrido), Alkynyl(vinylidene), Alkynyl(allene), Alkynyl(olefin), and Alkynyl(enyne) Rhodium Complexes", Organometallics, 2004, 23, 24, pp. 5713-5728 <doi:10.1021/om049389f>.
Schoen, Kurt L., et al., "The Base-catalyzed Alkylation of Fluorene with Alcohols", J. Am. Chem. Soc., 1955, 77, 22, pp. 6030-6031. Retrieved from <https://pubs.acs.org/doi/10.1021/ja01627a068>.
Shen, Di., et al., "Hydrogen-Borrowing and Interrupted-Hydrogen-Borrowing Reactions of Ketones and Methanol Catalyzed by Iridium", Angew. Chem. Int. Ed., 2015, 54, pp. 1642-1645, <doi:10.1002/anie.201410391>.
Shylesh, Sankaranarayanapillai, et al., "In Situ Formation of Wilkinson-Type Hydroformylation Catalysts: Insights into the Structure, Stability, and Kinetics of Triphenylphosphine- and Xantphos-Modified $Rh/SiO_2$", AC Catal., 2013, 3, pp. 348-457 <doi:10.1021/cs3007445>.
Sigma-Aldrich, "Traditional-Strong-and-Hindered-Bases", ChemFiles, 2001-2003, 3, 1, pp. 1-6. Retrieved from <https://www.sigmaaldrich.com/chemistry/chemical-synthesis/learning-center/chemfiles/chemfile-2001-2003/vol-3-no-1/traditional-strong-and-hindered-bases.html>.
Slatford, Paul A., et al., "C—C Bond formation from alcohols using a Xantphos ruthenium complex" Tetrahedron Lett., 2006, 47, pp. 6787-6789 <doi:10.1016/j.tetlet.2006.07.069>.

Smith, A.K., et al., "Surface-Supported Metal Cluster Carbonyls. Chemisorption Decomposition and Reactivity of $Rh_6(CO)_{16}$ Supported on Alumina, Silica-Alumina, and Magnesia", 1979, Inorganic Chemistry, 18, 11, pp. 3014-3112.
Stoltz, B.M., et al., "Alkylations of Enols and Enolates", Comprehensive Organic Synthesis, II, 3, pp. 1-55 <doi:10.1016/B978-0-08-097742-3.00301-3>.
Streitwieser, Andrew, Jr., "Solvolytic Displacement Reactions at Saturated Carbon Atoms", Chem. Rev., 1956, 56, 4, pp. 571-752. Retrieved from <https://pubs.acs.org/doi/10.1021/cr50010a001>.
Sun, Haifeng, et al., "One-Pot Approach for C—C Bond Formation through Ruthenium-Amido Complex Catalyzed Tandem Aldol Reaction/Hydrogenation", Synthesis, 2010, 15, pp. 2577-2582 <doi:10.1055/s-0029-1218815>.
Van't Blik, H.F.J., et al., "Structure of Rhodium in an Ultradispersed $Rh/Al_2O_3$ Catalyst as Studied by EXAFS and Other Techniques", J. Am. Chem. Soc., 1985, 107, 11, pp. 3139-3147.
Verde-Sesto, Ester, et al., "Postfunctionalized Porous Polymeric Aromatic Frameworks with an Organocatalyst and a Transition Metal Catalyst for Tandem Condensation-Hydrogenation Reactions", ACS Sustainable Chem. Eng., 2016, 4, pp. 1078-1084. Retrieved from <https://pubs.acs.org/doi/10.1021/acssuschemeng.5b01147>.
Vidal, José L., et al., "Rhodium-Carbonyl Cluster Chemistry under High Pressure of Carbon Monoxide and Hydrogen. 1. Infrared Spectroscopic Study of Homogeneous Systems Active in the Catalytic Synthesis of Polyalcohols from CO and $H_2$", Inorg. Chem., 1980, 19, 4, pp. 896-903. Retrieved from <https://pubs.acs.org/doi/10.1021/ic50206a021>.
Wang, Jiayi, et al., "3-Butyl-1-methylimidazolinium borohydride [bmim][$BH_4$])—a novel reducing agent for the selective reduction of carbon-carbon double bonds in activated conjugated alkenes", Tetrahedron Lett., 2008, 49, pp. 6518-6520.
Watanabe, Yoshihisa, et al., "Application of Water Gas Shift Reaction to Organic Synthesis -C-Alkylation of Ketones and Picolines, and Reductive Dimerization of Aldehydes"—Abstract, 1985, 3, pp. 507-511.
Watanabe, Yoshihisa, et al., "Rhodium Catalyzed α-Methylation of Ketones With Carbon Monoxide-Water-Formaldehyde System", Chem. Lett., 1978, 7, pp. 215-216.
Xu, Ruibo, et al., "Iron-Catalyzed Homogeneous Hydrogenation of Alkenes under Mild Conditions by a Stepwise, Bifunctional Mechanism", ACS Catal., 2016, 6, pp. 2127-2135 <doi:10.1021/acscatal.5b02674>.
Xue, Dong, et al., "Transfer Hydrogenation of Activated C=C Bonds Catalyzed by Ruthenium Amido Complexes: Reaction Scope, Limitation, and Enantioselectivity", J. Org. Chem., 2005, 70, 9, pp. 3584-3591. Retrieved from <https://pubs.acs.org/doi/10.1021/jo0478205>.
Yagafarov, Niyaz Z., et al., "Reductive Transformations of Carbonyl Compounds Catalyzed by Rhodium Supported on a Carbon Matrix by using Carbon Monoxide as a Deoxygenative Agent", ChemCatChem, 2015, 7, 17, pp. 2590-2593. Retrieved from <https://onlinelibrary.wiley.com/doi/abs/10.1002/cctc.201500493>.
Yang, Xianghua, et al., "Facile metal free regioselective transfer hydrogenation of polarized olefins with ammonia borane", Chem. Commun., 2011, 47, pp. 2053-2055 <doi:10.1039/c0cc03163a>.
Yang, Xianghua, et al., "Synthetic and mechanistic studies of metal-free transfer hydrogenations applying polarized olefins as hydrogen acceptors and amine borane adducts as hydrogen donors", Org. Biomol. Chem., 2012, 10, pp. 852-860 <doi:10.1039/c1ob06381b>.

* cited by examiner

EXTRACTION OF SELECTED PLATINUM-GROUP METALS FROM SUPPORTED CATALYST

CROSS-REFERENCE TO RELATED APPLICATION

This application claims priority to and the benefit of U.S. Provisional Application No. 62/590,833, filed on Nov. 27, 2017, the entire contents of which are incorporated herein by reference.

STATEMENT REGARDING FEDERALLY SPONSORED RESEARCH OR DEVELOPMENT

This invention was made with government support under NSF CHE1649579 from the National Science Foundation. The government has certain rights in this invention.

TECHNICAL FIELD

The present application generally relates to methods of chemical extraction.

BACKGROUND

Catalytic converters are devices that are included in exhaust systems of internal combustion engines to convert toxic materials, such as nitrogen oxides, carbon monoxide, and unburned hydrocarbons, into relatively innocuous materials such as carbon dioxide and water vapor. Catalytic converters have been required in vehicles with internal combustion engines in the United States since the 1970s, resulting in tens or hundreds of millions of catalytic converters being included in running and decommissioned vehicles worldwide.

In general, a catalytic converter includes a support layer, typically a metal oxide over a ceramic core, and a catalyst layer including one or more precious metals. Catalytic metals frequently found in catalytic converters include, but are not limited to, platinum, palladium, and rhodium. Each of these is expensive, with platinum and rhodium frequently exceeding $1500 per troy ounce, and palladium approaching $1000 per troy ounce. Due to their cost, and to the small amount of these metals produced by mining (only about 25 tons per year in the case of rhodium), it is desirable to recycle the catalytic precious metals for reuse.

At present, recovery of these precious metals is difficult, requiring energy-intensive, high temperature processes, such as smelting. More recently, methods have been developed using strong acids to recover rhodium from spent catalysts. However, these workflows are dangerous, involving harsh conditions and generally requiring electrolysis to recover usable metal. Although a substantial portion of palladium and platinum may be recovered in such a process, yields of rhodium are relatively low, and must be followed by a reduction process to generate rhodium with an oxidation state of zero.

It has been a challenge to develop a method of recovering precious metals from spent catalysts, particularly rhodium, under non-acidic conditions and at relatively low temperature, and with high yield.

SUMMARY

In one aspect, the present disclosure provides a method of extracting a selected platinum group metal from a composite. The method may include immersing the composite comprising the selected platinum group metal in a liquid comprising a polar molecule; and while the composite is immersed, exposing the composite to a reactive gas to extract the selected platinum group metal therefrom. The composite may be a supported catalyst including a particulate catalyst bonded to a support layer. The particulate catalyst may include the selected platinum group metal and the support layer may include a support material. The selected platinum group metal may be one of rhodium, rhenium, and platinum. The reactive gas may be one of carbon monoxide and nitric oxide. The liquid may be an aqueous liquid. The support material may include at least one of a metal oxide, a mixed metal oxide, a metal carbonate, a metal phosphate, a base metal, a metal alloy, a polymeric material, and a carbon-based material. The pH of the liquid during reaction may be non-acidic, or may be greater than 2, or in some cases, in the range between 2 and 12.

In another aspect, the present disclosure provides a method of extracting rhodium from a composite including a support layer bonded to the rhodium. The method may include placing the composite into an aqueous liquid comprising an organic solvent to form a sample, and exposing the sample to one of nitric oxide and carbon monoxide at a temperature below 80 degrees Celsius to extract the rhodium.

In a further aspect, the present disclosure provides a method of separating rhodium from a supported catalyst, including placing a supported catalyst including rhodium and an inert support material into an aqueous liquid; and exposing the supported catalyst to one of nitric oxide and carbon monoxide at a temperature below 80 degrees Celsius to extract the rhodium. The supported catalyst may be a spent supported catalyst such as from a catalytic converter.

Further objects, features and advantages of this system will become readily apparent to persons skilled in the art after a review of the following description, with reference to the drawings and claims that are appended to and form a part of this specification.

DETAILED DESCRIPTION

The drawings are purely schematic illustrations of various aspects of the method described herein, and are not necessarily to scale unless expressly stated.

The terms "substantially" or "about" used herein with reference to a quantity includes variations in the recited quantity that are equivalent to the quantity recited, such as an amount that is equivalent to the quantity recited for an intended purpose or function. "Substantially" or derivatives thereof will be understood to mean significantly or in large part. When used in the context of a numerical value or range set forth, "about" or "substantially" means a variation of ±10%, or less, of the numerical value. For example, a value differing by ±10%, or ±5%, or ±1%, among others, would satisfy the definition of "about."

Figure 1:
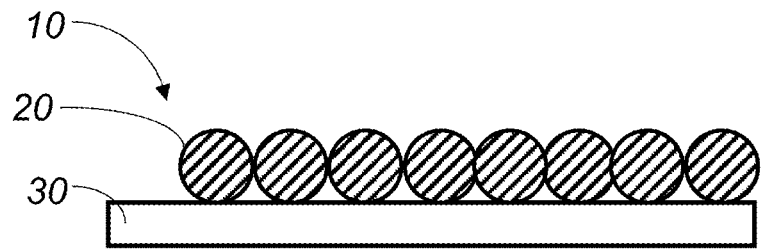
FIG. 1 is a schematic view of a supported catalyst.

In one embodiment, the present disclosure relates to the extraction of a catalytic metal, which in some cases is a precious metal, from a support, or a support layer, which terms are used interchangeably herein. A schematic of a supported catalyst 10 is illustrated in FIG. 1. The catalytic material 20 is bound to the non-catalytic, or inert, support layer 30, which is made of at least one support material. Although supported catalysts can have widely varying compositions, the present disclosure primarily treats those with compositions similar to what are found in catalytic converters for vehicles; that is, those with precious metal catalytic components, including the selected platinum group metals. In the context of the present application, the following elements will be treated as selected platinum group metals: platinum, palladium, rhodium, iridium, ruthenium, osmium, and rhenium. In another aspect of the invention, the catalyst may comprise at least one metal selected from the group consisting of platinum, palladium, rhodium, iridium, ruthenium, osmium, and rhenium. Preferably, the catalyst may comprise at least one metal selected from the group consisting of rhodium, ruthenium, osmium, and rhenium. More preferably, the catalyst may comprise rhodium.

The support material 30 of the supported catalyst 10 is made of one or more materials that are catalytically inert in the context of the reaction being catalyzed. The support materials of the present disclosure may be metal oxides; in particular, oxides of titanium, aluminum, or mixtures thereof. In another embodiment, a support material of a catalyst to be used in a method of the present disclosure may be a carbon-based material, including but not limited to carbon nanotubes or carbon nanoparticles. The supported catalyst may be understood to be an example of a composite, or the catalyst may be a heterogeneous catalyst. The support layer may be a porous layer, as such a structure assists in maximizing the amount of catalytic surface area provided by the catalyst.

Figure 2:
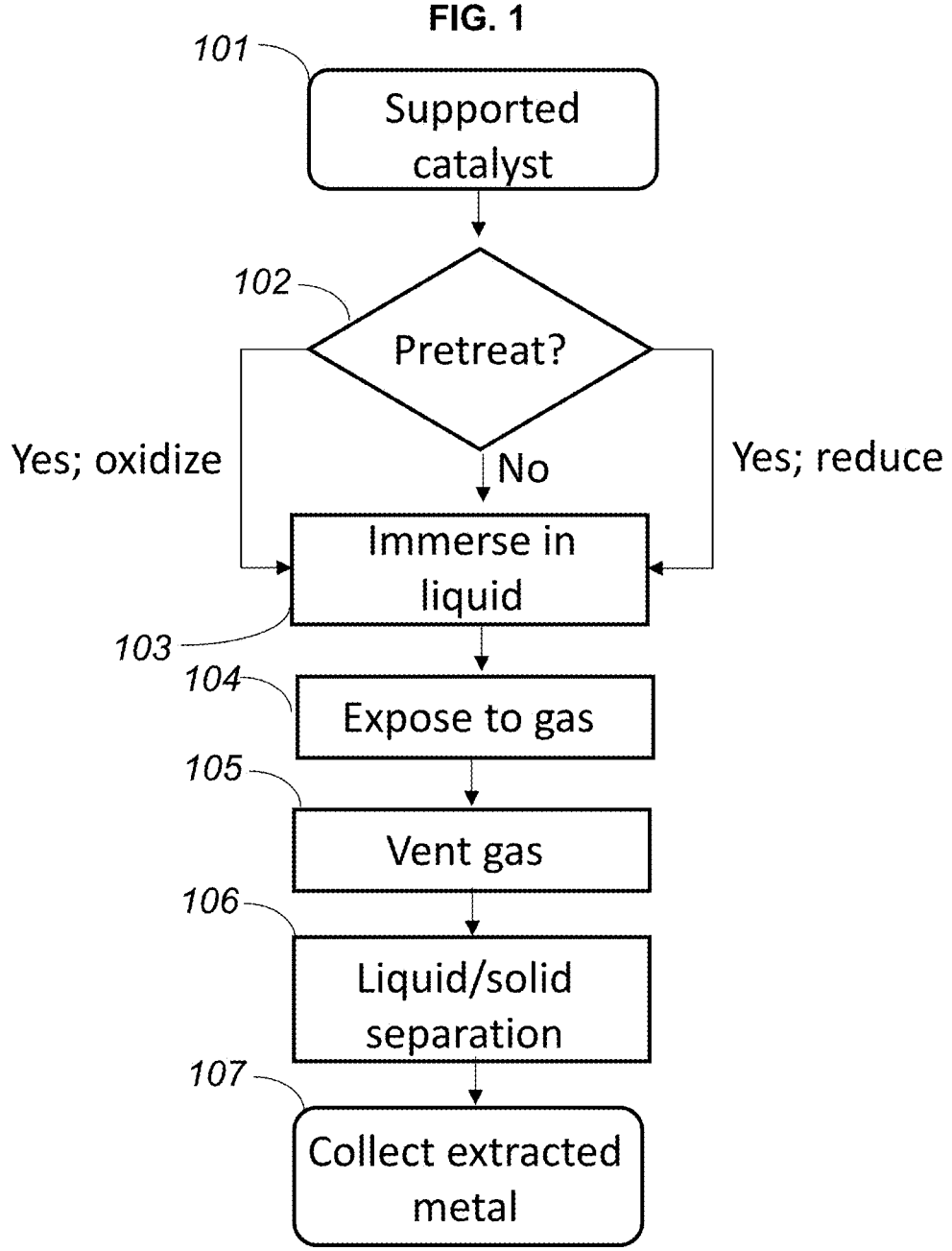
FIG. 2 is a flow chart of an extraction process in accordance with an embodiment of the method disclosed herein.

A method of extracting a catalytic metal from a support layer is detailed in the flow chart of FIG. 2. At step 101, the supported catalyst is supplied. The catalyst may be a spent catalyst, such as found in a catalytic converter retrieved from a vehicle. At step 102, an optional pretreatment step may be carried out. In general, pretreatment involves flowing a gas, including an oxidizing gas or gas mixture such as air, or a reducing gas or gas mixture such as hydrogen, over the catalytic material in order to ensure that the oxidation state of substantially all of the catalytic material is uniform. The gas may oxidize the catalytic metal (such as when, for example, air is flowed over the sample), or it may be reducing (such as, for example, hydrogen.) In some embodiments, the pretreatment step is carried out at an elevated temperature, such as between about 100 degrees Celsius (° C.) and 600° C., or between about 325° C. and about 550° C. The pretreatment step may last between about 2 hours and about 48 hours, or between about 3 hours and about 36 hours, or between about 4 hours and about 24 hours, or between about 6 hours and about 18 hours, or any value in between these.

In the third step 103, the supported catalyst is immersed in a liquid. The nature of the liquid is selected such that the catalytic metal will leach away from the solid support layer and can be collected in the liquid after the process is complete. In some embodiments, the liquid is aqueous. The liquid may simply be water. Alternatively, the liquid may contain an organic solvent, which may assist in coordinating the catalytic metal, buffering the pH, or for any other purpose. Suitable organic solvents include, but are not limited to, nitriles, including acetonitrile (MeCN); amides, such as dimethylformamide (DMF); toluene; tetrahydrofuran (THF); dichloromethane (DCM); hexane; ethylacetate; and methyl tert-butyl ether (MTBE). In some embodiments, the liquid, or the organic solvent, has a dipole moment of greater than 2.

In some embodiments, such as embodiments in which triethylamine ($Et_3N$), trimethylamine ($Me_3N$) or ethyldimethylamine ($EtNMe_2$), among others, are employed, these molecules function as bases, which stands in contrast to the liquids employed in conventional extraction techniques, which are almost universally strong acids. The liquid is stirred or gently agitated in order to maximize gas dissolution in the liquid, and to keep a flow of liquid over the catalyst, or if the catalyst is particulate in nature, to keep the catalytic particles suspended in the liquid for greater reaction efficiency. Stirring may be achieved in one example by the use of a magnetic stir bar, and with a stir rate in the range of 50 to 500 rotations per minute (rpm).

In step 104, the sample including the supported catalyst is exposed to a reactive gas to extract or leach the catalytic metal from the support layer. The reactive gas, in one embodiment, may be may be carbon monoxide (CO). In another embodiment, the reactive gas may be nitric oxide (or nitrogen monoxide), (NO). In certain embodiments, the reactive gas may be a mixture of carbon monoxide or nitric oxide with another gas, such as hydrogen. The reactive gas may be supplied such that the total pressure of the reaction vessel is between about 1 bar and about 26 bar, or any value between about 1 bar and 26 bar inclusive, including about 10 bar, about 12 bar, about 14 bar, about 15 bar, about 16 bar, about 20 bar and about 25 bar, or any value between any two of the aforementioned pressures.

The reactive gas may, also or additionally, be supplied as a liquid precursor, such that carbon monoxide or nitric oxide (both hazardous substances) need not be supplied directly to the sample to be treated. One such precursor is formic acid, which decomposes to carbon monoxide and water in the presence of rhodium (including when in contact with the composite.) In other embodiments, the precursor may be one of formaldehyde and chloroform. The exposure step may be carried out for about 1 hour, or about 2 hours, or about 4 hours, or about 6 hours, or about 12 hours, or about 24 hours, or about 48 hours, or about 72 hours, or any amount of time between about 15 minutes and about seven days, such that the metal is extracted and separated from the support layer.

During the exposure period, the metal to be extracted becomes unbound from the support material, and is leached or dissolved as atoms or multiatomic compounds or clusters into the immersion liquid, which may define a supernatant of the system. Some of the metal to be extracted may still be physically attached on the support material, though not chemically bound to the support. In general, the support material itself remains intact through this process, and does not dissolve. After the reaction is complete, the gas may be vented in step 105 to allow for convenient liquid/solid separation under atmospheric conditions.

In step 106, the solid support may be separated from the immersion liquid in a separation step, such as by filtration, centrifugation, or any other known method for liquid/solid separation. A solid residue resulting from separation may be rinsed by organic solvents such as acetonitrile or diethyl ether to clear any lingering reactants and to dislodge any of the metal to be extracted from the support. In some cases under less pressure than provided during the exposure step, the extracted metal may be precipitated out of the immersion liquid upon prolonged exposure to atmosphere. Finally, in step 107, the metal that has been extracted may be collected, such as by solvent removal under reduced pressure or metal precipitation followed by filtration, centrifugation, or any other extraction method as is known in the art.

The extraction methods as detailed herein may be carried out without resorting to the use of caustic strong acids, as current methods may require, improving the safety of recycling processes for catalytic precious metals. The reaction conditions may be alkaline, neutral, or slightly acidic, including a pH of about 2 or greater. In some embodiments, the pH may be in the range between about 2 and about 12, or about 2 and about 10, or about 2 and about 9, or about 2 and about 8, or about 2 and about 7.5, or about 2 and about 7, or about 2 and about 6.5, or about 2 and about 6, or about 2 and about 5, or about 2 and about 4, or about 2 and about 3, or at any value between about 2 and about 12, such as about 2, or about 3, or about 4, or about 5, or about 6, or about 6.5, or about 7, or about 7.5, or about 8, or about 9, or about 10, or about 11, or about 12. This improves the nature of the waste products, which are not as environmentally harmful as currently-practiced recycling methods, and alleviate the need for costly corrosion resistant extraction equipment.

Additionally, the method may be carried out at relatively low temperature, such as at 80° C. or below, or at 70° C., or at 55° C., or at 45° C., or at 25° C., or at 20° C. The conditions for reaction may be low-acid conditions, and the extraction may be carried out at room temperature, defined herein as between about 20 to about 25° C. The method of extraction is a non-electrolytic method, thereby saving energy costs and equipment costs, and further improving safety.

In some cases, the method may be used to extract rhodium from among other catalytic metals. For example, under the same conditions, such as those described in Example 21 below, 77% of Rh was extracted from the support layer, whereas 12% of Pd was extracted, and virtually no Pt or Ru was extracted; hence in relative terms, about 6.4 times more Rh was extracted than Pd. In contrast, presently-employed methods tend to be better suited for recovery of platinum and palladium from a support layer, rather than rhodium.

The use of this technology is not limited to the extraction of precious (or catalytic) metal from a supported or heterogeneous catalyst. Other uses may include, but are not limited to, the extraction of selected platinum group metals from other materials, such as extraction of rhodium from nuclear waste and anode mud, recycling of rhodium from carbon monoxide sensors, and extraction of rhenium from the blade coatings of jet engines.

EXAMPLES

The principles of the present disclosure are further clarified by the following examples. These examples are not intended to be limiting, but rather provide a basis for demonstrating the efficacy of the method.

Example 1: Rhodium Leaching from a Titanium Oxide Support

In this Example, 30 milligrams (mg) of a supported catalyst made up of rhodium supported on titanium oxide ($TiO_2$), the rhodium being present at 0.83% weight percentage (wt %), was immersed in a solution of 2 ml acetonitrile, 0.4 ml ethyldimethylamine, and 0.4 ml water. The immersed catalyst and gas were charged to a pressure vessel containing a magnetic stir bar. The pressure vessel was put on top of a stir plate equipped with temperature and stir rate control. For this experiment, CO pressure was kept at 14 bar and the catalyst was stir at room temperature for 24 h. The pressure vessel was vented and the immersed catalyst was filtered, washed with diethyl ether and dried. The solid support was analyzed for Rh content using inductively coupled plasma optical emission (ICP-OES). When quantified, the amount of rhodium remaining on the support was found to be about 7% of the original rhodium content. Thus, about 93% of rhodium is extracted under such conditions.

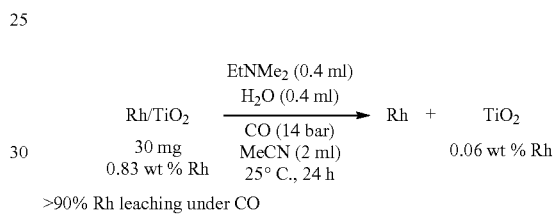

>90% Rh leaching under CO

Example 2: Air at 1 Bar is not Effective to Extract Rhodium

The trial described in Example 1, when repeated under open air, yielded a loss from 0.83 wt % supported Rh to 0.80 wt % supported Rh. Thus, about 96% of the rhodium remained associated with the support, even after 24 hours. Hence, less than 5% of Rh was extracted at low pressure and without CO. Without wishing to be bound by any theory, the fact that the metal is extracted under carbon monoxide, but not when exposed to air, suggests that the rhodium may be extracted from the support in the form of a metal carbonyl, or in a hydride form.

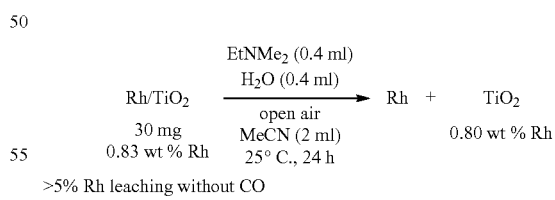

>5% Rh leaching without CO

Example 3: Rhodium Leaches from Titanium Oxide Support at 60° C.

The trial of Example 1 was repeated, but at 60° C. rather than at room temperature. Less than 4% of the rhodium remained associated with the support in this Example, demonstrating a possible increase in efficiency over the conditions of Example 1.

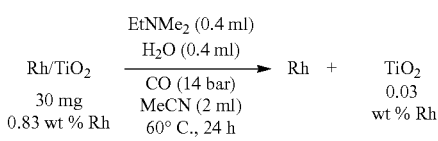

>95% Rh leaching at 60 C.

Example 4: Rhodium Leaches at 78% when Pretreated to Oxidize the Rhodium

The reaction conditions of Example 1 were repeated, except prior to immersion in the liquid, the supported catalyst was exposed to air flow for 4 hours at 325° C., the temperature being increased from room temperature to 325° C. at a 2° C./min ramp rate. Exposure to air flow under these conditions has the effect of ensuring that nearly all of the rhodium surface of the supported catalyst will be in an oxidized state. After immersion and exposure to CO, the final wt % of Rh in the supported catalyst was 0.18%, meaning that about 78% of the rhodium had been extracted even after oxidizing the supported catalyst.

Example 5: Rhodium can be Extracted Using DMF as the Solvent

The conditions of Example 1 were replicated for this trial, but DMF replaced acetonitrile as an organic solvent. This resulted in the supported catalyst decreasing from 0.83 wt % Rh to 0.1 wt % Rh, meaning that 88% of the rhodium was extracted.

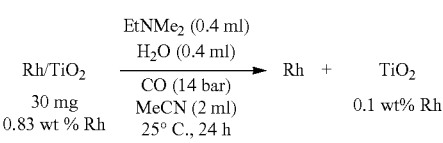

88% Rh leaching in DMF

Example 6: Rhodium can be Efficiently Extracted from an Alumina Support

Rhodium leaching is not specific to a titanium oxide support. In this Example, 30 milligrams (mg) of a supported catalyst made up of rhodium supported on aluminum oxide ($Al_2O_3$), the rhodium being present at 0.42% weight percentage (wt %), was pretreated under air flow at 325° C. and immersed in a solution of 2 ml acetonitrile, 0.4 ml ethyldimethylamine, and 0.4 ml water. The sample was exposed to CO at 25 bar pressure for 24 hours at 70° C., with stirring. After this, the amount of rhodium remaining on the support was quantified, and found to be about 7% of the original rhodium content. Thus, about 93% of rhodium is extracted under such conditions.

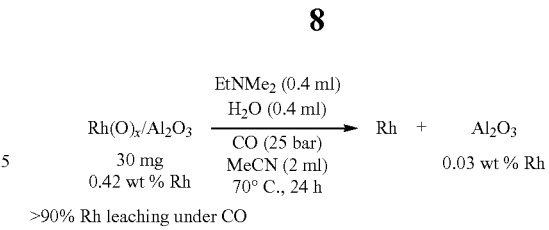

>90% Rh leaching under CO

Figure 3:
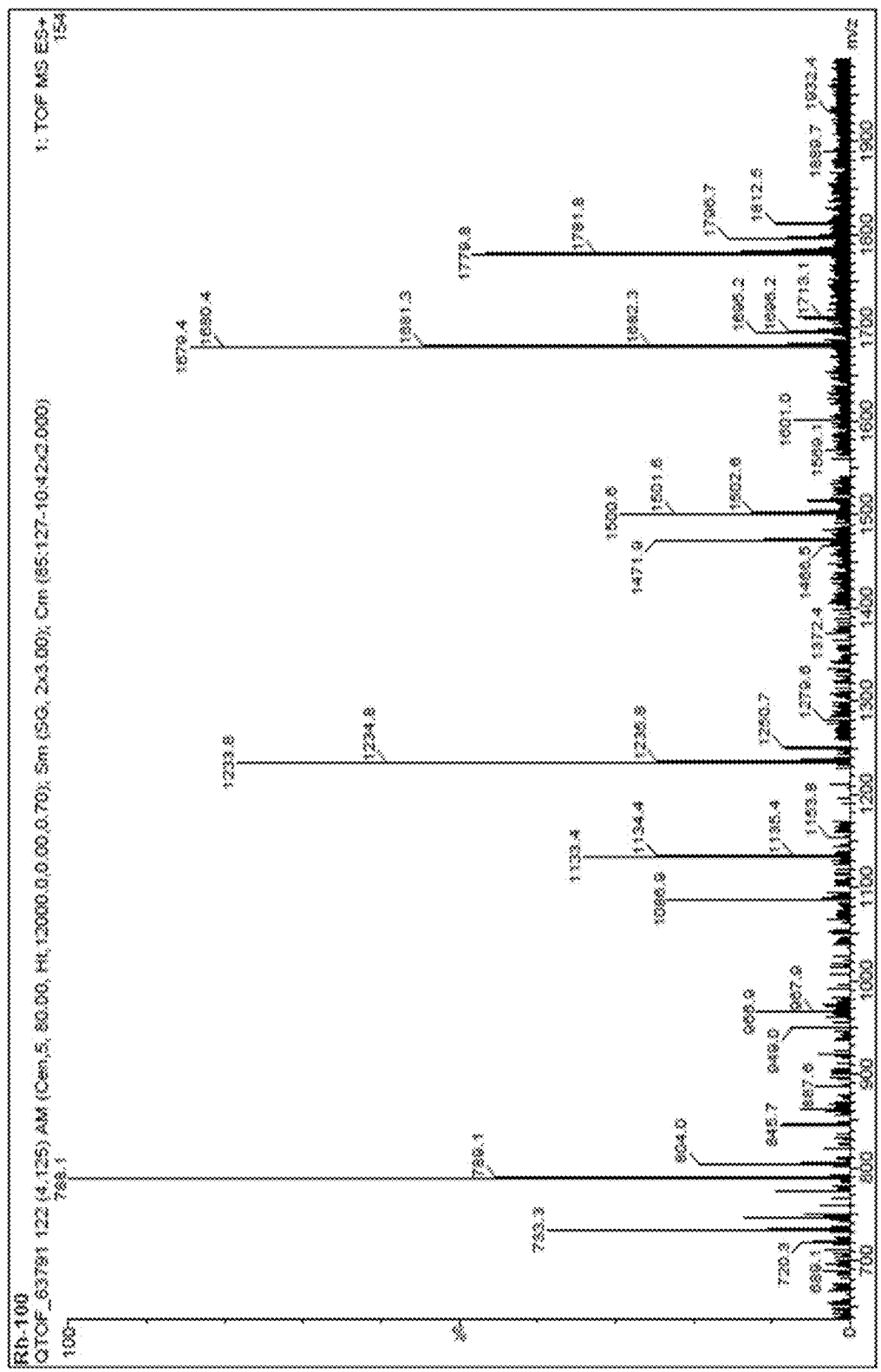
FIG. 3 is a mass spectrum of rhodium extracted from an aluminum oxide support.
Figure 4:
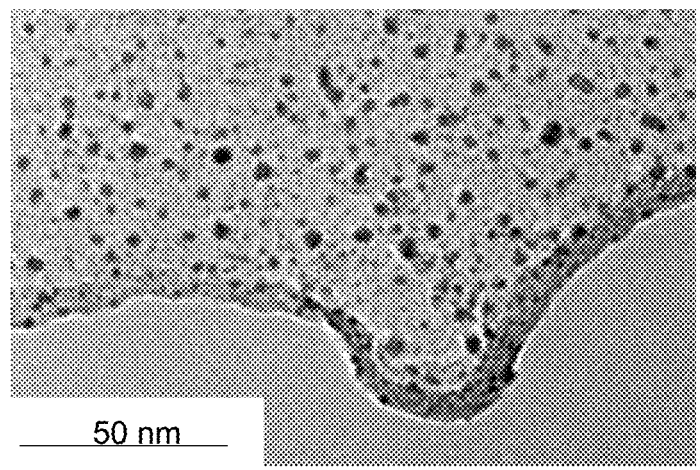
FIG. 4 is a transmission electron micrograph of a rhodium residue from an extraction process according to the present disclosure.

Example 7: Rhodium Leaches from Aluminum Oxide Support after Reduction by $H_2$ The conditions of Example 6 were repeated, except instead of pretreatment of the sample under air flow, the composite was instead pretreated under hydrogen flow for 4 hours at about 500° C. This treatment has the effect of reducing the precious metal of the catalyst. After 24 hours of leaching under CO, the alumina support was filtered, and the rhodium content was reduced to 0.05 wt %, meaning that more than 85% of the Rh was extracted using this protocol. The post-leaching supernatant was pale violet after venting the CO and slowly turned green upon exposure to air. Fitting the mass spectrum of the post-leaching solution shows that Rh is extracted in the form of polynuclear clusters containing 4 to 10 Rh atoms per cluster, and around 3 CO per Rh atom on average (see FIG. 3). The solvent was removed under reduced pressure, leaving an Rh-rich brown residue. Transmission electron microscopy (TEM) images of the residue showed the formation of metallic nanoparticles in the range of 1 mm to 3 mm in size (see FIG. 4). The residue was heat treated under hydrogen atmosphere at 200° C. to obtain metallic powder that contains 93.18% rhodium by weight.

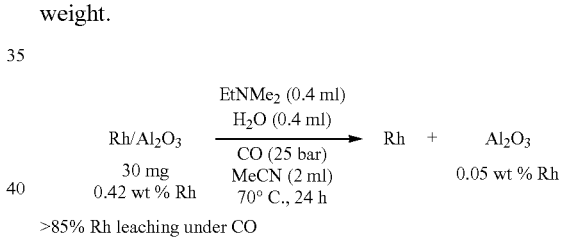

>85% Rh leaching under CO

Example 8: Rhodium is not Extracted from Aluminum Oxide Support without CO

The conditions of Example 7 were repeated, but the reaction conditions were under air at 1 bar. Over 95% of the initial Rh was still associated with the support after such a reaction.

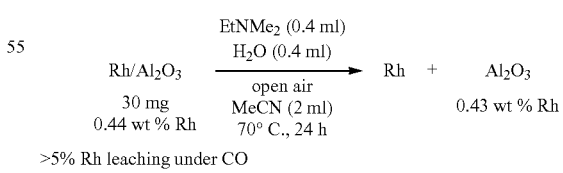

>5% Rh leaching under CO

Example 9: Impact of Pressure on Rhodium Extraction from an Alumina Support

Figure 5:
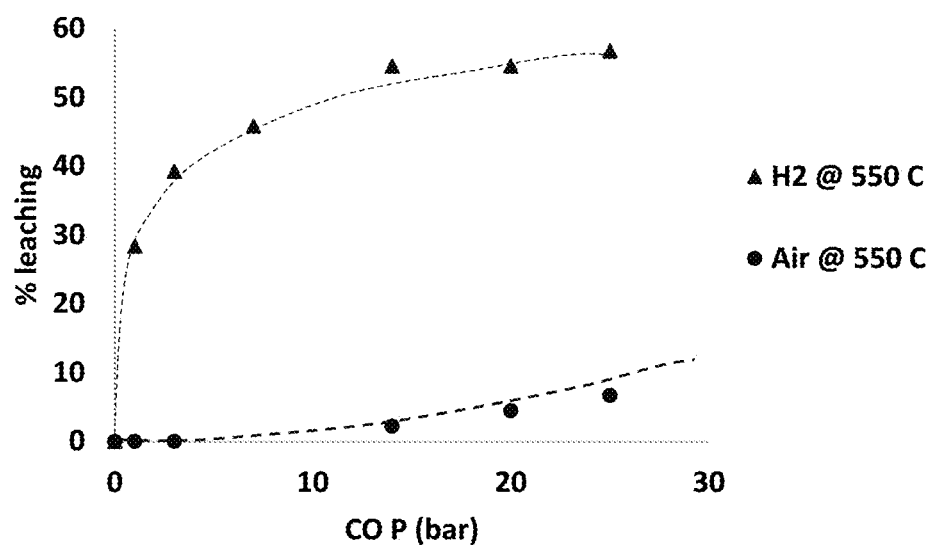
FIG. 5 is a graph illustrating the influence of pressure of reactive gas on extraction efficiency.

A supported catalyst of Rh (0.48% by weight) supported on alumina was pretreated either with air flow or hydrogen flow to oxidize or reduce the catalytic metal, respectively. The catalyst was then immersed in a solution of MeCN (2 ml), triethylamine (0.4 ml), and water (0.4 ml) and exposed to a variety of pressures during reaction with CO. A graph of the results of these trials is shown in FIG. 5. As can be seen, an increase in pressure generally translates to improved yield, and reduced rhodium dissociates from the support more readily than does the oxidized form.

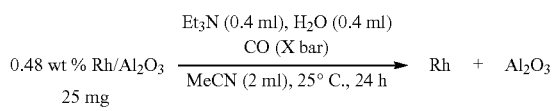

Example 10: Rhodium can be Efficiently Extracted from a Carbon Support

A commercial sample of rhodium (2.57% weight) supported on carbon was immersed in 2 ml MeCN, 0.4 ml Et$_3$N, and 0.4 ml water, and exposed to carbon monoxide at 20 bar for 24 hours at 70° C. After treatment, the wt % of Rh remaining associated with the nanotubes was measured at 0.67%, a 74% reduction. At present, metals are generally separated from nanotubes by methods destructive to the support. This can be disadvantageous because of how costly (at least about $100 per gram) carbon nanotubes are. This method may allow for recovery both of a precious catalytic metal and intact nanotubes using a gentle procedure.

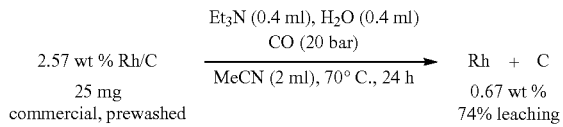

Example 11: Extraction of Rhodium from Alumina Using Toluene (MePh) Rather than MeCN A sample of Rh (0.48% by weight) supported on alumina was pretreated with either hydrogen or air, and then immersed in 2 ml toluene, and a variety of conditions including triethylamine and/or water, and exposed to CO at 20 bar for 24 hours at room temperature. When 0.4 ml each of Et$_3$N and water was added, substantial rhodium (77%) was extracted from the alumina support. When water was absent, less than 10% of the Rh was extracted. Therefore, it is likely that water plays a role in the mechanism of extraction.

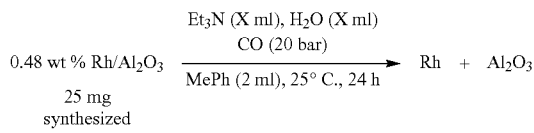

| entry | Pretreat @ 550° C. | Et$_3$N (ml) | H$_2$O (ml) | Rh content (wt %) | % extracted |
|---|---|---|---|---|---|
| 1 | Hydrogen | 0.4 | 0.4 | 0.11 | 77 |
| 2 | Hydrogen | 0.4 | 0 | 0.45 | 6 |
| 3 | Hydrogen | 0 | 0 | 0.41 | 9 |
| 4 | Air | 0.4 | 0 | 0.43 | 4 |

Example 12: Rhodium can be Extracted from an Alumina Support Using a CO/H$_2$ Syn-Gas A sample of Rh (0.44% by weight) supported on alumina was pretreated with hydrogen, and then immersed in 2 ml of either toluene or acetonitrile, 0.4 ml triethylamine, and 0.4 ml water. This sample was then exposed to CO and H$_2$ each provided at a partial pressure of 13 bar for 48 hours at room temperature. 75% of the Rh was extracted when acetonitrile was employed, and 68% was extracted when toluene was used. Use of a CO/H$_2$ syn-gas allows for efficient extraction of Rh from alumina.

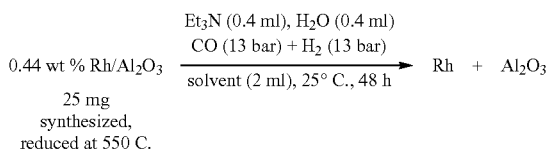

| Entry | solvent | Rh content wt % | % leaching |
|---|---|---|---|
| 1 | acetonitrile | 0.11 | 75 |
| 2 | toluene | 0.14 | 68 |

Example 13: Rhodium Leaches from a High-Loading Sample

Figure 6:
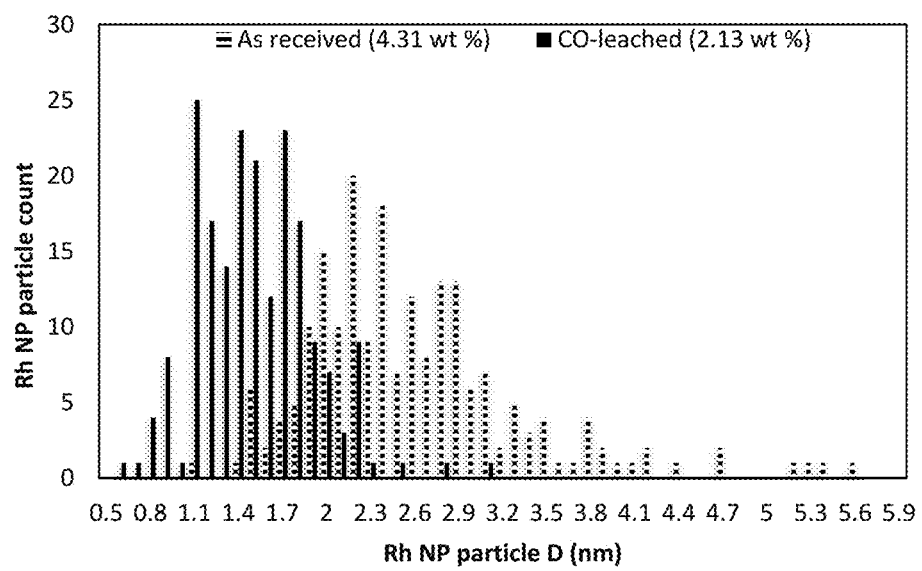
FIG. 6 is histogram of average particle sizes of rhodium before and after extraction from a high-loading sample.

A more densely-loaded sample of Rh supported on alumina (4.31% Rh by weight) was exposed to the reaction conditions as outlined in Example 10, for 72 hours. This resulted in 86% of the rhodium being extracted, yielding a supported catalyst having 0.6 wt % rhodium. Following this, the supported catalyst was immersed and treated with CO for another 24 hours, but at room temperature, which led to a final Rh concentration associated with the support of 0.24% by weight. This translates to extraction of over 94% of the original rhodium. The average particle size was reduced due to leaching, from 2.7 mm to 1.6 mm, and that particle distribution size was narrower as measured by TEM (see FIG. 6), with a standard deviation decreasing from about 0.75 to about 0.4).

Example 14: Influence of Hydrogen/Water/Air on Rhodium Extraction

To test the impact of pretreatment of catalyst with hydrogen versus air, and to assess the difference between performance of the method when omitting a solvent component, a number of trials were run in parallel. Pretreatment with hydrogen produced better Rh extraction, and omitting either the base (Et$_3$N) or water (whether as its own component, or as a contaminant from acetonitrile) impacted the yield of Rh as shown below.

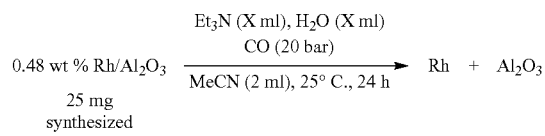

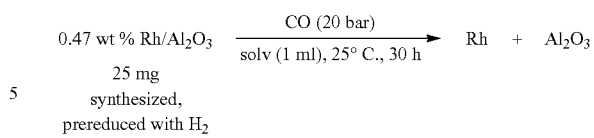

| entry | Pretreat @ 550° C. | Et₃N | H₂O | Rh content wt % | % leaching |
|---|---|---|---|---|---|
| 1 | Hydrogen | 0.4 | 0.4 | 0.1 | 78 |
| 2 | Hydrogen | 0.4 | 0 | 0.21 | 53 |
| 3 | Hydrogen | 0 | 0 | 0.25 | 44 |
| 4 | Hydrogen | 0** | 0 | 0.38 | 16 |
| 5 | Air | 0.4 | 0 | 0.44 | 2 |
| 6 | Air | 0.4 | 0.4 | 0.44 | 2 |

**in trial 4, piperidine was used instead of triethylamine.

Without wishing to be bound by any theory, the pretreatment step being carried out at 550° C. in Example 14 may oxidize the entire rhodium content of the sample to Rh(III), whereas pretreatment at 325° C. only oxidizes the surface rhodium to Rh(I), thus explaining the difference with a previous trial. The support (titania vs. alumina) may also factor into the efficiency of leaching.

Example 15: Influence of Water/Solvent Mixtures on Rhodium Extraction

To test the impact of the identity of organic solvent on extraction efficiency, supported rhodium catalysts were treated with hydrogen and then immersed in a solvent as listed below in the presence of triethylamine, water, and carbon monoxide. In all cases, extraction efficiency was between 64% and 78%.

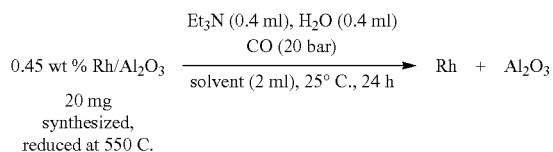

| entry | solvent | Rh content wt % | % leaching |
|---|---|---|---|
| 1 | acetonitrile | 0.10 | 78 |
| 2 | dimethylformamide | 0.12 | 73 |
| 3 | ethanol | 0.14 | 69 |
| 4 | dioxane | 0.16 | 64 |
| 5 | toluene | 0.11 | 76 |
| 6 | triethylamine | 0.14 | 69 |

Figure 7:
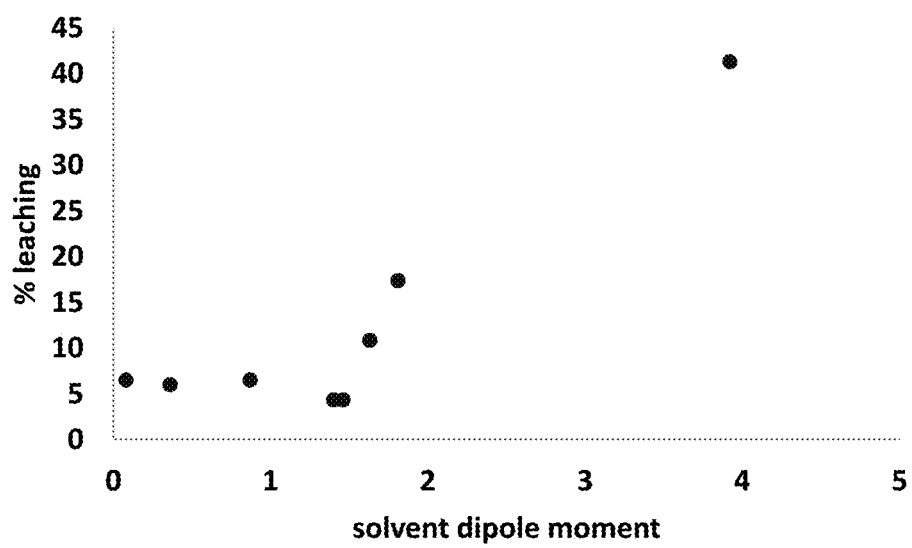
FIG. 7 is a graph illustrating the influence of solvent polarity on extraction efficiency.

Example 16: Influence of Dipole Moment of a Solvent on Extraction Efficiency To test the impact of a solvent alone on extraction, without the addition of water, a rhodium (0.47% by weight) supported catalyst was immersed in 1 ml of the solvent and exposed to CO for 30 hours at room temperature. As can be seen in the table below, and in the graph of FIG. 7, as dipole moment increases, extraction of rhodium increases. It is noted that immersing the supported catalyst in water alone caused disintegration of the support, thereby making quantitation difficult.

| entry | solvent | Dipole moment | % leaching |
|---|---|---|---|
| 1 | tetrahydrofuran | 1.63 | 11 |
| 2 | dichloromethane | 1.46 | 4 |
| 3 | hexane | 0.08 | 7 |
| 4 | ethyl acetate | 1.81 | 17 |
| 5 | methyl tert-butyl ether | 1.4 | 4 |
| 6 | acetonitrile | 3.92 | 41 |
| 7 | triethylamine | 0.87 | 7 |
| 8 | toluene | 0.36 | 6 |
| 9 | water | 1.85 | 65 |

Example 17: Inorganic Salts, Bases, and Strong Chelating Agents do not Inhibit Leaching Because some supported catalysts may be exposed to contaminants, extraction of rhodium (0.41% by weight) from an alumina support was carried out in the presence of high levels of sodium chloride, or relatively concentrated sodium hydroxide (NaOH), or 2,2'-bipyridine (bpy). In no case was significant inhibition of extraction observed.

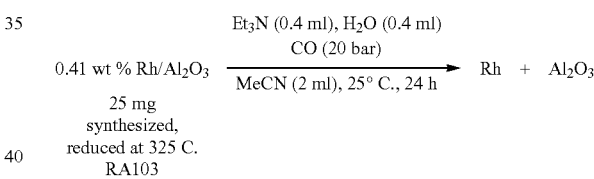

| entry | additive | Rh content wt % | % leaching |
|---|---|---|---|
| 1 | 10 mg NaCl, tap water | 0.03 | 93 |
| 2 | 0.5M NaOH | 0.04 | 90 |
| 3 | 10 mg bpy | 0.06 | 85 |

Example 18: Formic Acid can be a Carbon Monoxide Surrogate

In some cases, it may be undesirable to use the toxic gas carbon monoxide in order to carry out extraction. In such cases, formic acid (HCOOH) may be employed, as HCOOH breaks down into CO and water. A supported catalyst (0.47% by weight Rh supported on alumina) was pretreated with hydrogen gas and incubated with HCOOH (1 ml), Et₃N (0.4 ml), and MeCN (2 ml) at 70° C. for 24 hours, and then at room temperature for 12 hours thereafter. No additional CO was added, and the system was not pressurized. This resulted in extraction of 80% of the Rh from the support. In comparison, 0% leaching was observed when acetic acid was employed in place of formic acid.

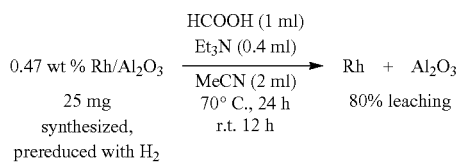

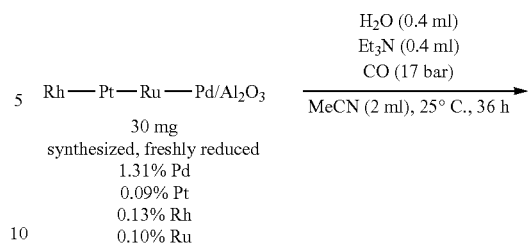

Example 19: Palladium is not Extracted Under Conditions Favorable for Rhodium Extraction When palladium, rather than rhodium, is supported on alumina and exposed to solvent and gas conditions that would favor extraction of rhodium, less than 5% leaching is observed, suggesting that these conditions are specific to rhodium.

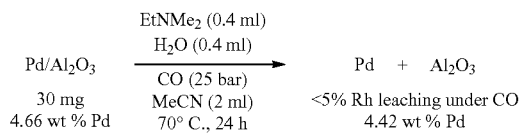

Example 20: Iridium is not Extracted Under Conditions Favorable for Rhodium Extraction When iridium, rather than rhodium, is supported on alumina and exposed to solvent and gas conditions that would favor extraction of rhodium, less than 5% leaching is observed, suggesting that these conditions are specific to rhodium.

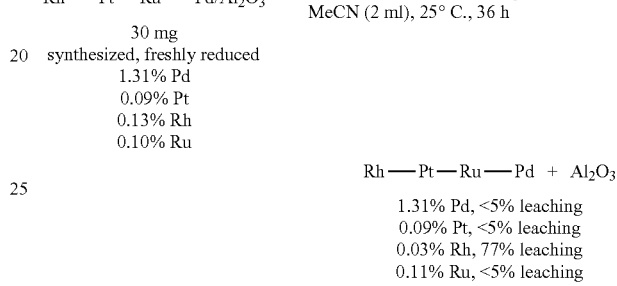

Example 21: Selective Extraction of Rhodium from a Freshly-Reduced Metal Mixture with and without Base at Room Temperature A metal mixture was prepared by mixing four different alumina-supported metals: Pd, Pt, Rh, and Ru. The mixture had a total mass of 30 mg and was 1.31% Pd, 0.09% Pt, 0.10% Ru, and 0.13% Rh by weight. The mixture was reduced under hydrogen gas at about 500° C. and then immersed in MeCN (2 ml), Et$_3$N (0.4 ml), and H$_2$O (0.4 ml), and exposed to CO at 17 bar. The reaction was held at 25° C. for 36 hours. Under these conditions, 77% of the Rh was extracted from the support layer (0.03% final), 12% of the Pd was extracted (1.15% final), and less than 5% each of Pt and Ru were extracted (0.09% and 0.11% final, respectively.) The trial was repeated without the base (Et$_3$N) and the results were identical, except that effectively no Pd was extracted when the base was absent. Thus, eliminating the base made the process more selective for Rh under these conditions.

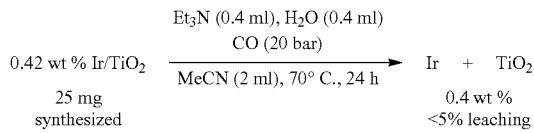

Example 22: Effect of Aging on Extraction

Two samples of Rh (0.47% wt %) supported on alumina were tested; both were reduced under hydrogen at 500° C., and then the samples were stored for three months under atmospheric air. Prior to analysis, a first sample was freshly reduced under hydrogen, and the other was not. More than twice the Rh was extracted from the reduced sample as was from the untreated sample. Without wishing to be bound by any theory, this is likely due to oxidation of the sample.

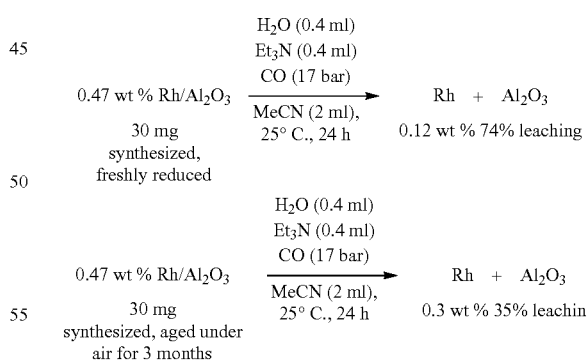

Figure 8:
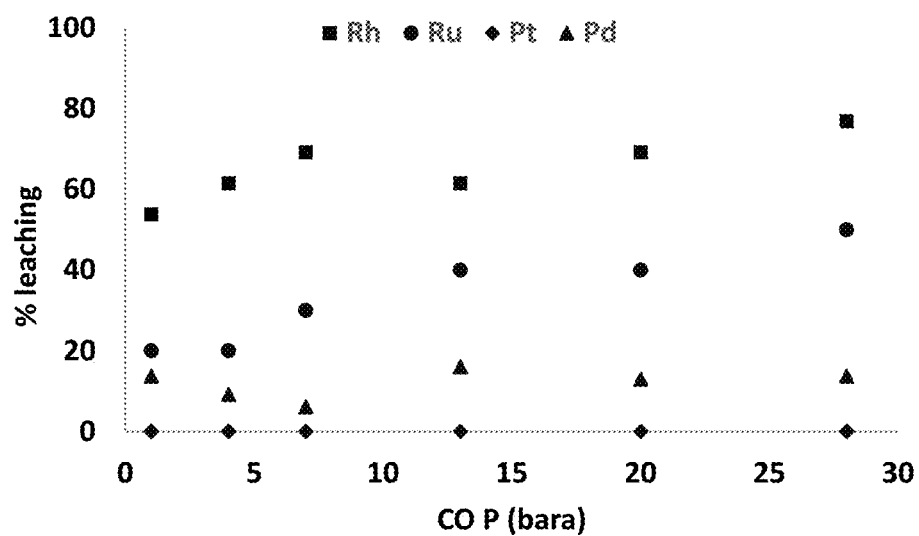
FIG. 8 is a graph illustrating the extraction of a variety of metals from a support layer under carbon monoxide and at a number of different pressures.

Example 23: Extraction of Metals from a Mixture at 70° C. at Different Pressures A metal mixture was prepared by mixing four different alumina-supported metals: Pd, Pt, Rh, and Ru. The mixture had a total mass of 30 mg and was 1.31% Pd, 0.09% Pt, 0.10% Ru, and 0.13% Rh by weight, the Rh having been "aged" under atmospheric air for three months (see Example 22.) The mixture was immersed in MeCN (2 ml), Et$_3$N (0.4 ml), and H$_2$O (0.4 ml), and exposed to CO at a variety of pressures, ranging from 1 bar to 28 bar. The reaction was held at 70° C. for 48 hours. Under these conditions, platinum was not effectively extracted at any pressure; about 10% of palladium was extracted at all pressures, likely due to the presence of base; about 20% to about 40% of Ru was extracted across the range of CO; and about 50% to about 80% of Rh was extracted as pressure increased (see FIG. 8). Thus, Rh is more readily extracted than Ru, which is more easily extracted than Pd, which is more easily extracted than Pt.

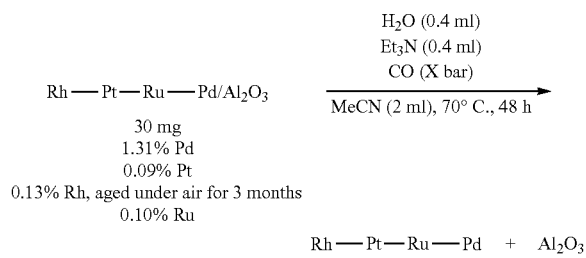

Example 24: Platinum Leaching from Alumina Support

A catalyst including platinum rather than palladium is tested under the same conditions as in Example 19. Platinum remains associated with the support.

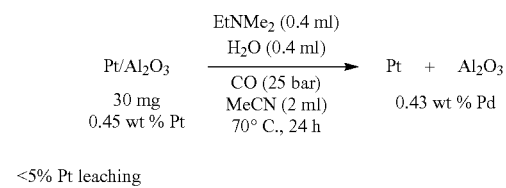

Figure 9:
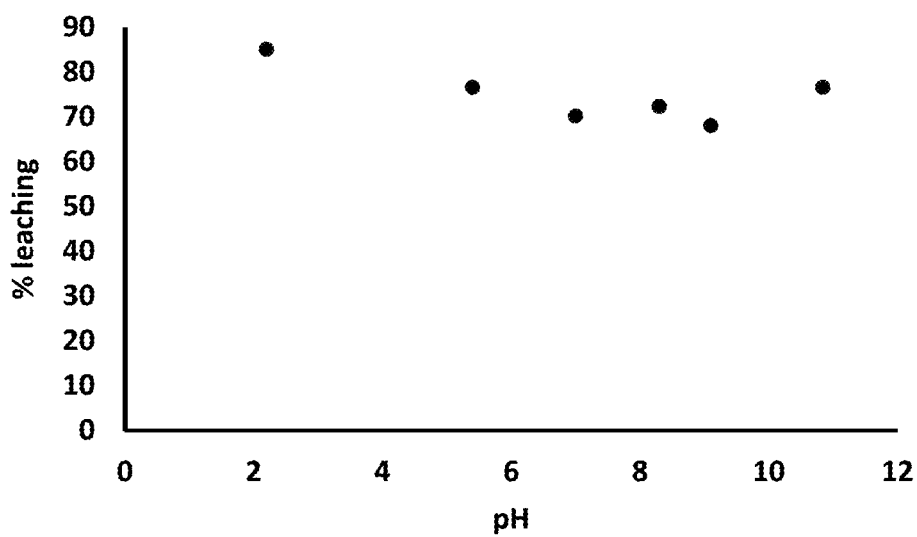
FIG. 9 is a graph illustrating the effect of pH on extraction of rhodium from a support layer.

Example 25: Extraction of Rhodium from a Support in an Acetonitrile/Water Mixture Occurs at Acidic, Basic, and Nonacidic Conditions Freshly reduced rhodium supported on aluminum oxide was immersed in water (0.4 ml), MeCN (2 ml), and a volume of Et$_3$N or HCl at a range of pH between 2 and 12, and exposed to CO at 14 bar. The reaction was held at 25° C. for 24 hours, and the amount of rhodium extracted was quantified. As can be seen in FIG. 9, rhodium was extracted efficiently at pH of 2, 5, 7, 8, 9, and 11. Therefore, the methods of the present disclosure may be used at least at a pH of between about 2 and about 12 in order to extract a selected platinum-group metal from a support.

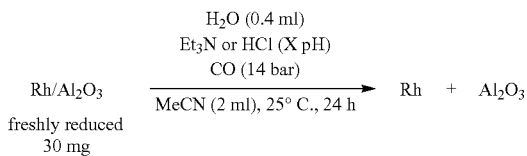

Example 26: Rhodium Selectively Leaches from Pd/Rh Catalyst

The method of Example 1 is repeated with both palladium and rhodium supported on the support material. Under these extraction conditions, rhodium is efficiently extracted, while palladium remains associated with the support.

Example 27: Rhodium Selectively Leaches from Pt/Rh Catalyst

The method of Example 1 is twice repeated with both platinum and rhodium supported on the support material. In the first trial, the platinum and rhodium are alloyed. In the second, the platinum and rhodium are supported independent of one another. Under these extraction conditions, in the first case both metals are extracted, whereas in the second, rhodium is efficiently extracted, while platinum remains associated with the support. It is thought that the leaching of rhodium in the alloy causes the platinum to leach off of the support layer as well.

Example 28: Osmium, Ruthenium, and Rhenium can be Extracted from a Titanium Oxide Support The method of Example 7 is repeated for catalysts in which osmium, ruthenium, and rhenium are supported. In each case, these metals leach efficiently from the support.

Example 29: Use of Nitric Oxide

The examples in which CO was employed are repeated, but utilizing NO at the same pressure in place of CO. In each case, similar amounts of catalytic metal are extracted as though CO had been used.

As a person skilled in the art will readily appreciate, the above description is only meant as an illustration of implementation of the principles this application. This description is not intended to limit the scope of this application in that the system is susceptible to modification, variation and change, without departing from the spirit of this application, as defined in the following claims.

What is claimed is:

1. A method of extracting a selected platinum group metal from a composite, the method comprising:
immersing in a liquid comprising a polar molecule at a pH of greater than 2 a composite comprising a supported catalyst comprising a particulate catalyst bonded to a support, the particulate catalyst comprising the selected platinum group metal and the support comprising a support material; and
while the composite is immersed in the liquid comprising the polar molecule at a pH greater than 2, exposing the composite to a reactive gas to extract the selected platinum group metal therefrom.

2. The method of claim 1, wherein the selected platinum group metal comprises one of rhodium, rhenium, ruthenium, palladium, or platinum.

3. The method of claim 1, wherein the selected platinum group metal comprises rhodium.

4. The method of claim 1, wherein the polar molecule is an organic solvent.

5. The method of claim 1, wherein the reactive gas comprises one of carbon monoxide or nitric oxide.

6. The method of claim 1, wherein the exposure of the composite to the reactive gas occurs at a pressure between 1 bar and 25 bar.

7. The method of claim 1, wherein the exposure to the reactive gas occurs at a temperature below 80 degrees Celsius.

8. The method of claim 1, wherein the reactive gas is generated by reaction of a liquid precursor in contact with the composite.

9. The method of claim 8, wherein the liquid precursor comprises one of formic acid, formaldehyde, and chloroform.

10. The method of claim 1, wherein the polar molecule comprises at least one of acetonitrile, ethyldimethylamine, dimethylformamide, or trimethylamine.

11. The method of claim 1, wherein at least 90% of the selected platinum group metal is extracted from the composite after 24 hours.

12. The method of claim 1, further comprising pretreating the composite at an elevated temperature and under a flow of pretreatment gas.

13. The method of claim 1, wherein the selected platinum group metal is in oxidized form in the composite.

14. The method of claim 1, wherein the selected platinum group metal is in reduced form in the composite.

15. A method of extracting a quantity of rhodium from a composite, the method comprising:
   immersing the composite into an aqueous liquid comprising an organic solvent at a pH of greater than 2, the composite comprising a supported catalyst comprising a particulate catalyst bonded to a support, the particulate catalyst comprising the selected platinum group metal and the support comprising a support material; and
   while the composite is immersed in the aqueous liquid comprising the organic solvent at a pH greater than 2, exposing the composite to one of nitric oxide or carbon monoxide at a temperature below 80 degrees Celsius to extract the quantity of rhodium.

16. The method of claim 15, wherein extraction is conducted at a pressure between 1 bar and 25 bar and at a temperature between 25 degrees Celsius and 70 degrees Celsius.

17. The method of claim 15, wherein the organic solvent comprises at least one of acetonitrile, ethyldimethylamine, dimethylformamide, or trimethylamine.

18. The method of claim 15, wherein at least 90% of the rhodium is extracted after 24 hours.

19. A method of separating rhodium from a supported catalyst, the method comprising:
   immersing a supported catalyst comprising rhodium and a catalytically inert support material into an aqueous liquid comprising at least one of acetonitrile, ethyldimethylamine, dimethylformamide, or trimethylamine at a pH of greater than 2; and
   while the supported catalyst is immersed in the aqueous liquid comprising the at least one of acetonitrile, ethyldimethylamine, dimethylformamide, or trimethylamine at a pH greater than 2, exposing the supported catalyst to one of nitric oxide and carbon monoxide at a temperature below 80 degrees Celsius and at a pressure between 1 bar and 25 bar to extract the rhodium, such that at least 90% of the rhodium is extracted after 24 hours.

* * * * *